(12) United States Patent
Peeters et al.

(10) Patent No.: US 7,978,302 B2
(45) Date of Patent: Jul. 12, 2011

(54) FABRICATION OF DICHROIC GUEST-HOST POLARIZER

(75) Inventors: Emiel Peeters, Eindhoven (NL); Dirk Jan Broer, Eindhoven (NL)

(73) Assignee: Sumitomo Chemical Co. Ltd., Tokyo (JP)

( * ) Notice: Subject to any disclaimer, the term of this patent is extended or adjusted under 35 U.S.C. 154(b) by 650 days.

(21) Appl. No.: 11/993,594

(22) PCT Filed: Jun. 23, 2006

(86) PCT No.: PCT/IB2006/052061
§ 371 (c)(1),
(2), (4) Date: Dec. 21, 2007

(87) PCT Pub. No.: WO2007/000705
PCT Pub. Date: Jan. 4, 2007

(65) Prior Publication Data
US 2010/0045900 A1    Feb. 25, 2010

(30) Foreign Application Priority Data

Jun. 27, 2005   (EP) .................................... 05105720

(51) Int. Cl.
*G02F 1/13*    (2006.01)

(52) U.S. Cl. ........................................................ 349/194
(58) Field of Classification Search .................. None
See application file for complete search history.

(56) References Cited

U.S. PATENT DOCUMENTS
2006/0046163 A1 *  3/2006  Broer et al. ..................... 430/7

FOREIGN PATENT DOCUMENTS
JP           08239666 A  *  9/1996
WO    WO 2004036299 A1  *  4/2004

\* cited by examiner

*Primary Examiner* — Sarah Hahm
(74) *Attorney, Agent, or Firm* — Birch, Stewart, Kolasch & Birch, LLP (57) ABSTRACT

A method for the manufacture of a polarizer is provided. The method comprises providing a liquid crystal composition comprising a liquid crystal host and a viscosity enhancer; providing a thin film of said composition on a substrate; orienting said liquid crystal host to obtain an aligned film in a first liquid crystal mesophase, wherein the liquid crystal host is aligned planar to said substrate; gelating said viscosity enhancer to congeal said film; and obtaining a second liquid crystal state in said congealed film. By the use of a viscosity enhancer in the composition, homeotropic alignment of the liquid crystal host can be suppressed.

31 Claims, 4 Drawing Sheets

FABRICATION OF DICHROIC GUEST-HOST POLARIZER

Polarizers are widely used in several different applications where polarization of light is desired. Currently, the most widely used polarizers for LCD applications are derivatives of the H-sheet polarizer as invented by E. H. Land in 1938. These dichroic polarizers consist of uniaxially stretched poly (vinyl alcohol) which is impregnated with iodine or doped with dichroic dyes. The moisture sensitive poly(vinyl alcohol) film is protected on both sides by a TAC-layer (triacetyl cellulose). On one side, an adhesive is applied in order to laminate the polarizer to the display. The total thickness of the polarizer-stack is about 70-150 µm.

There is a need in the art for polarizers that are capable of bringing a polarization selectivity which meets or even exceeds that of the H-sheet polarizer but which are much thinner than the H-sheet polarizer. A further need exists for polarizers that can be conveniently applied on the inside of a liquid crystal cell.

These and other objectives may be achieved by means of a dichroic guest-host polarizer. Such dichroic guest-host polarizers are for example described in the international patent application WO 2005/045485 A1. Guest-host polarizers may be described as polarizers where the polarization selective absorption of light is achieved by means of dichroic dyes (guests), which are oriented in an oriented polymerized liquid crystal host. The polarization performance of polarizers is conveniently described by using the dichroic ratio in absorption (DR).

In current day LCDs, the conventional H-sheet polarizers generally exhibit a DR of 30 or more and often even of 50 or more. The aforementioned guest-host polarizers have a dichroic ratio of 15 or more, and dichroic ratios of 50 or even more can be achieved when the oriented polymer films are based on reactive liquid crystals, which possess a highly ordered smectic phase. Especially the smectic B phase is very effective in providing oriented polymer films with high dichroic ratios. Other highly ordered smectic phases, e.g. smectic F and smectic I phases can also be used.

A planar alignment (long axis parallel to substrate plane) of the reactive liquid crystalline host material is essential in order to create the above-mentioned guest-host polarizers. However, reactive liquid crystalline materials often have a tendency towards homeotropic alignment (long axis of molecules is oriented along the substrate normal) when the material is applied as a thin film on a substrate provided with an alignment layer (rubbed polyimide or photo-alignment layer). The tendency towards homeotropic alignment is especially strong for liquid crystals in highly ordered smectic phases, e.g. smectic B, smectic F and smectic I.

The strong tendency towards homeotropic alignment of the reactive mesogen mixture (including dichroic dyes) during the processing of the aforementioned coatable guest-host polarizers is a serious problem, which can hamper the commercial breakthrough of this type of polarizers.

For reactive liquid crystalline materials in the nematic phase, it is possible to suppress the homeotropic alignment by addition of a small percentage of a surfactant to the reactive mesogen mixture.

The surfactant may for example be non-ionic fluoroalkylates as described in EP940707. Although the addition of a surfactant is an effective means to achieve planar orientation in nematic reactive mesogens the addition of surfactants generally does not suppress the tendency for homeotropic alignment in highly ordered smectic phases, such as the smectic B phase.

Planar alignment in highly ordered smectic phases may be obtained by providing a temporary second substrate during the processing of the mesogen mixture into a polarizer film.

After polymerization of the reactive mesogens into a highly cross-linked polymer film, the planar orientation is preserved. At this point, the temporary second substrate is removed. Thus, the use of a temporary second substrate may provide a means to achieve planar orientation in thin films of highly ordered smectic reactive mesogens. However, the use of a temporary second substrate is not desired in large volume production of guest-host polarizers.

From the above, it is clear that there is a need for a method of manufacturing guest-host polarizers based on highly ordered smectic reactive mesogens resulting in thin film guest-host polarizers with planar orientation of the smectic mesogens.

It is an object of the present invention to overcome this problem, and to provide a guest-host polarizer, which may be manufactured without the need for a temporary secondary substrate, while obtaining a high dichroic ratio.

The inventors have found that addition of a gelator to a liquid crystal composition may hamper the tendency towards homeotropical alignment.

An anisotropic gel network in the liquid crystal composition, formed at a liquid crystal phase exhibiting planar alignment, may function as an internal alignment source that maintains the planar alignment, even in highly ordered smectic phases, such as smectic B, F and I. Furthermore, the gelation and concomitant steep rise in viscosity will kinetically hamper the transition from a planar to an homeotropic orientation.

Thus, in a first aspect, the present invention relates to a method for the manufacture of a polarizer, the method comprising: providing a liquid crystal composition comprising a liquid crystal host and a viscosity enhancer; providing a thin film of said composition on a substrate; orienting said liquid crystal host to obtain an aligned film in a first liquid crystal mesophase, wherein the liquid crystal host is aligned planar to said substrate; gelating said viscosity enhancer to congeal said film; and obtaining a second liquid crystal state in said congealed film.

The liquid crystal host in the composition may be polymerizable and the method may further comprise polymerizing said liquid crystal host in said second liquid crystal state in said congealed film.

By polymerizing the film, the anisotropic properties in the film are irreversibly locked and become less temperature dependent.

The liquid crystal composition may comprise a dichroic light-absorbing guest dispersed in said liquid crystal composition. The dichroic light-absorbing guest may for example comprise an azo dye.

The viscosity enhancer may be an enhancer forming fibrillar aggregates in said film upon gelation.

A network of fibrillar aggregates, formed in an anisotropic liquid crystal phase, forms an anisotropic and efficient internal alignment source for the liquid crystal host. Such an anisotropic network is capable of hampering the transition from planar to homeotropical alignment at the transition from a nematic or low order smectic phase to a highly ordered smectic phase.

The viscosity enhancer may for example be an organic gelator, preferably chosen from the group consisting of fatty acid derivatives, steroid derivatives, anthryl derivates, gelators containing steroidal and condensed aromatic rings, azobenzene steroid-based gelators, amino-acid type organogelators, organometallic compounds, macrocyclic gelators, sorbitol and polyol derivatives, cellobiose octa(decanoat), n-alkanes, partially fluorinated n-alkanes, two-component systems and cyclic and linear bis-urea compounds and combinations of two or more thereof.

In embodiments of the present invention, the first liquid crystal state is or corresponds to a nematic phase or a smectic phase Sy, wherein Y is A or C.

In such liquid crystal phases, planar alignment is readily available. In addition, the order in such phases is high enough for a anisotropic network to form upon gelation, which network forms an efficient internal alignment source.

The first liquid crystal state may for example be obtained at a temperature above the gelating temperature of the viscosity enhancer.

In embodiments of the present invention, the orientation in said second liquid crystal state is or corresponds to a smectic phase Sx, wherein X is not A or C.

In such highly ordered liquid crystal phases, it is possible to achieve a high dichroic ratio for a polarizer of the present invention.

The second liquid crystal state may for example be obtained at a temperature below the gelating temperature for the viscosity enhancer.

In embodiments of the present invention, the liquid crystal host comprises a polymerizable liquid crystal of formula (I)

(I)

wherein

X, X' and X" independently is substituted or un-substituted Ph or Cyc, where Ph is a 1,4-phenylene unit and Cyc is a trans-1,4-cyclohexene unit;

Y and Y' independently is —$CH_2CH_2$—, —$CH_2O$—, —$OCH_2$—, —OCO—, —COO—, —N=N—, —C=C—, —C≡C—, —C=N—;

U and U' independently is a polymerizable group, or U is a polymerizable group and U'=H, or U=H and U' is a polymerizable group;

V and V' independently is a spacer; and

W and W' independently is a direct bond, —O—, —S—, —COO—, or —OCO—.

In a second aspect, the present invention relates to a polarizer, comprising an oriented film including an oriented liquid crystal host, a dichroic light-absorbing guest dispersed and oriented in said host, and a gelated viscosity enhancer, for example obtainable by a method of the present invention.

In a third aspect, the present invention relates to a composition for use in the manufacture of a polarizer, the composition comprising a liquid crystal host, a dichroic light-absorbing guest and a viscosity enhancer.

These and other aspects of the present invention will now be described in more detail, with reference to the appended drawings showing a currently preferred embodiment of the invention.

Figure 1:
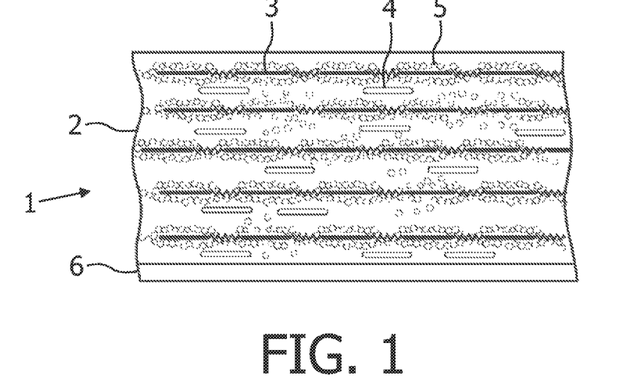
FIG. 1 is a schematic illustration of a polarizer in accordance with the present invention.

An exemplary embodiment of the present invention is illustrated in FIG. 1, showing in cross-section a polarizer according to the present invention. The polarizer 1 comprises an oriented polymer film 2 including an oriented and polymerized liquid crystal host 3, a dichroic light-absorbing guest 4, which is dispersed in and aligned with the host 3, and a viscosity enhancer 5 forming an anisotropic gel network in the film. The dichroic light-absorbing guest is dispersed in the form of distinct dichroic light-absorbing bodies. In general, the light-absorbing body may be an individual molecule (a dichroic dye), an aggregate or a network of such molecules or an inorganic particle (nano-particle) (a pigment). The optical absorption of an individual dichroic light-absorbing body is directionally dependent. Along one body axis, the light absorption is at a maximum, and along another axis, typically perpendicular to the axis of maximum absorption, the absorption is at a minimum.

The polymerized liquid crystal 3 is anisotropically oriented providing a long-range orientational order. The individual dichroic light-absorbing bodies of the guest 4 are aligned with the host 3, thus providing the oriented polymer film with directionally dependent light absorption properties, and thus the ability to polarize light.

The dichroic bodies of the guest 4 may have an oblong shape and being planar uniaxial oriented in the polymer film. However, other shapes, such as disc-shapes, and orientations, such as homeotropic or biaxial, may also be used.

In principle, any dichroic guest may be used. It may be a dye or a pigment, it may be dispersed on a molecular scale or disperse as light absorbing particles. The color of the dichroic guest is selected with a view to the application. Typically, absorption is to be achieved in the visible range of the spectrum, 400 to 700 nm. This may be achieved by using black dichroic colorants or by suitable combinations of colorants, such as red, green and blue. As used herein, the term "oriented" and related terms, such as "orientation" refers to "anisotropically oriented" and is synonymous to "aligned". "Oriented" refers to that the matter, of which the object to which it refers is formed, has a long-range orientational order in the form of a mono-domain (or a plurality of mono-domains laid out in accordance with a desired pattern), as opposed to a random multi-domain structure. This renders the properties, such as the optical properties, of the object directionally dependent in a controlled and desired manner.

Orientation of a dichroic guest is facilitated by means of the liquid crystal host. The liquid crystal host is aligned, and the dichroic guest is aligned with the host.

As used herein, the term "polymerized liquid crystal" means a polymer, which is or can be brought into an oriented state or is derived from a mesophase of a liquid crystal. A "liquid crystal polymer" is a specific type of polymerized liquid crystal; it is a polymer and a liquid crystal. In general a polymerized liquid crystal need not it self be a liquid crystal. It is sufficient that when provided in an oriented state, the state derives from or is commensurate with a liquid crystal mesophase. Such compounds are accessible by for example polymerizing a liquid crystal in a mesophase. Upon polymerization, the mesophase is immobilized and the orientation fixed.

As used herein, the term "polymerized liquid crystal" refers in general to any polymerized liquid crystal or any composition including such a polymerized liquid crystal, such as compositions and mixtures comprising a plurality of different polymerized liquid crystals.

The orientation of the guest 4 provides a polarizer having an extinction axis that is aligned with the axis of the planar uniaxial orientation.

In order to provide an oriented polymer film that has a dichroic ratio about 15 and more, the dichroic guest, and thus the polymerized liquid crystal host, must be highly oriented.

As used herein, the term "dichroic ratio" relates to the dichroic ratio in absorption, and is defined as the ratio of the absorbance (measured at normal incidence) along the extinction axis and the absorbance along the transmission axis.

Dichroic azo dyes are suitable for use as guests in a polarizer of the present invention. Examples of dichroic dyes include, but are not limited to those disclosed in U.S. Pat. No. 6,133,973 and in WO 2005/045485 A1.

Suitable dichroic guests include, but are not limited to the following azo dyes.

The dichroic guest may be liquid crystalline per se, but also non-liquid crystalline dichroic guests may be used.

The amount of dichroic guest will depend on the application and on how much guest the host can tolerate before precipitation of the guest, or before the desired high ordered phase is not achievable.

Typically, the amount is less than about 50 weight %, such as less than about 20 weight %, for example less than about 10 weight %.

It has been found that in order to obtain a high enough dichroic ratio in guest-host polarizers, it is suitable to use smectic phases in the liquid crystal host.

It has also been found that the degree of order typically provided by smectic A phases is too low, and that smectic C phases and other tilted smectic phases are generally not suitable. Further, nematic phases also have a degree of order, which is too low to provide the desired dichroic ratios.

Suitable mesophases include smectic B or tilted variants thereof, i.e. smectic F and smectic I phase, crystal B and its tilted versions, i.e. crystal G and J, and crystal E and tilted versions thereof, that is crystal H and K. The suitable mesophases have in common the long-range orientational order.

Oriented polymer films with or without dichroic guests, more particular polarizers comprising such oriented films may be formed of liquid crystal polymers having a smectic phase $S_x$ (X not A or C). Such polymers are linear main chain or side chain polymers, which may or may not be cross-linked after having been deposited in the form of a film. A polarizer in accordance with the invention is a specific embodiment of such an oriented film. Other applications of such oriented films includes retarders and bifocal lenses.

Preferred oriented polymer films are those comprising a polymerized liquid crystal, which is obtained by polymerizing an oriented liquid crystal.

Preferably, polymerizable liquid crystals having a smectic phase $S_x$ (X not A or C), polymerized in that phase are used.

Liquid crystal hosts suitable for use in the present invention for forming the polymerized liquid crystal include, but are not limited to, those described for example in WO 2005/045485 A1.

For example, polymerizable liquid crystals of the formula (I) may be used in the manufacture of oriented films.

wherein

X, X' and X" independently is substituted or un-substituted Ph or Cyc, where Ph is a 1,4-phenylene unit and Cyc is a trans-1,4-cyclohexene unit, wherein substituents are selected from the group consisting of methyl, CN, F, Cl and Br;

Y and Y' independently is —CH$_2$CH$_2$—, —CH$_2$O—, —OCH$_2$—, —OCO—, —COO—, —N═N—, —C═C—, —C≡C—, —C═N—;

U and U' independently is a polymerizable group, or U is a polymerizable group and U'═H, or U═H and U' is a polymerizable group, wherein U and U' typically are photo-polymerizable groups, such as CH$_2$═CH—, CH$_2$═CCl—, CH$_2$═C(CH$_3$)— or 4-vinylphenyl, meth(acrylate), vinylether, oxetane, epoxy or a thiolene system;

V and V' independently is a spacer, being of a conventional structure, such as C$_1$-C$_{20}$-alkyl group, optionally interrupted by one or more —O—, —S—, NH or NH$_3$ units and optionally substituted; and

W and W' independently is a direct bond, —O—, —S—, —COO—, or —OCO—.

To tune the properties of oriented films, a mixture of two or more polymerizable liquid crystals will generally be used, of which at least one or more of the components is a compound of formula (I).

For example, polymerizable liquid crystals of the formula II, III or IV may be used.

(IV)

However, in some embodiments of the present invention it may not be desired to provide a polarizer comprising a polymerized liquid crystal film. In such embodiments, also a non-polymerizable liquid crystal host may be used.

A polarizer according to the present invention may be provided as a freestanding polymerized film or as a polymerized or un-polymerized film arranged on a substrate 6. The substrate may be any substrate on which it is suitable to arrange a polarizer according to the present invention, and is typically a transparent or translucent anisotropic or isotropic polymeric or inorganic (such as glass or ceramic) substrate.

The substrate optionally comprises an alignment layer, on which the film is arranged and to which the liquid crystal hosts in the film are aligned.

The polarizer of the present invention further comprises a gelated viscosity enhancer. One object of this viscosity enhancer is to maintain a planar orientation of the liquid crystal host during the steps of manufacturing the polarizer. Another object of the viscosity enhancer, in particular in the case of a polarizer comprising a non-polymerized liquid crystal host, is to maintain a planar orientation of the liquid crystal host in the manufactured polarizer.

The viscosity enhancer will be described more in detail in context of the description of an exemplary method for the manufacture of a polarizer according to the present invention. This exemplary method is outlined in FIG. 2.

In an exemplary embodiment of a method for the production of a polarizer of the present invention, a liquid crystal composition comprising a polymerizable liquid crystal host and a gelating agent is provided.

Optionally, the liquid crystal composition comprises a polymerization initiator, for use in inducing polymerization, and/or a polymerization inhibitor, for inhibiting spontaneous polymerization.

If a dichroic polarizer is to be produced by the method, the liquid crystal composition may advantageously contain a dichroic light-absorbing guest as well. The liquid crystal composition is arranged as a thin film on a substrate. The thin film may be provided by conventional thin film forming methods, such as coating or printing methods. Suitable coating methods include spin coating, doctor blade coating, spray coating, dip coating and casting. Suitable printing methods include ink-jet printing, screen-printing and offset printing.

If needed, the composition to form the film may include film-forming promoters, such as solvents, adhesion promoters, wetting agents or surfactants.

The thin film is aligned on the substrate to form a ordered mesophase where the liquid crystal host is aligned planar on the substrate, i.e. the long axis of the liquid crystal monomers are directed perpendicular to the normal of the substrate.

Typically, an alignment layer is used to orient the liquid crystal. Suitable alignment layers include rubbed polyimide or obliquely sputtered silicon dioxide layers. However, other conventional alignment methods, such photo-alignment, may be used to provide planar aligned liquid crystal host on the substrate.

To provide the mesophase in which the liquid crystal host is aligned planar on the substrate, the film is typically brought to a temperature at which this planar alignment is obtained.

Figure 2A:
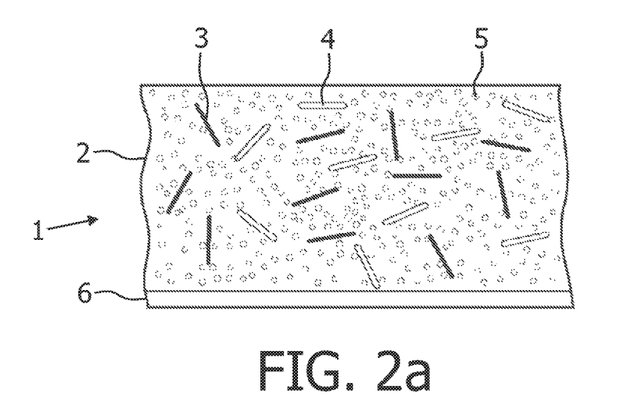
FIG. 2a-d is an outline of a method for the manufacture of a polarizer according to the present invention.
Figure 2B:
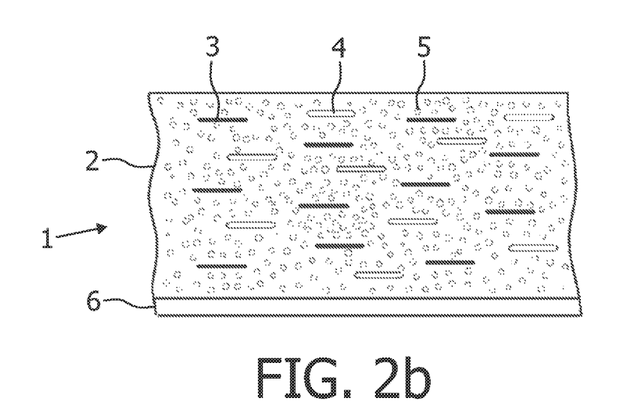

Typically, to obtain (planar) alignment to the alignment layer, the film is brought to a temperature where the liquid crystal host is isotropic (FIG. 2a), and is then cooled down to the temperature of the oriented phase with planar alignment, during which cooling step, the liquid crystal host aligns to the substrate (FIG. 2b).

Figure 2C:
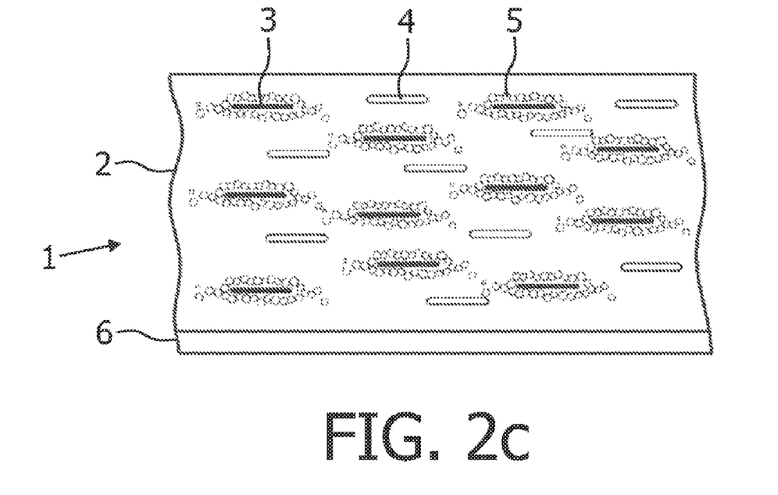

Typically, the liquid crystal host is in a nematic or smectic A or C phase when the planar alignment is obtained, and the temperature is above the gelating temperature of the gelating agent. However, as discussed above, this nematic or smectic A or C phase is not enough highly oriented in order to be used in a polarizer of the present invention. In order to obtain the desired highly ordered smectic $S_x$ phase (X not A or C), while preventing the tendencies to homeotropic alignment that is very common in these phases, the viscosity enhancer is gelated in order to congeal the film, under conditions where the planar alignment is still present in the film (FIG. 2c).

This may be achieved by lowering the temperature of the film to a temperature below the gelating temperature of the gelating agent ($T_g$), but above the transition temperature from the nematic or smectic A or C phase to the desired smectic Sx phase.

The gel network in the congealed film acts as an internal alignment source, and the tendencies to homeotropic alignment are drastically lowered.

Figure 2D:
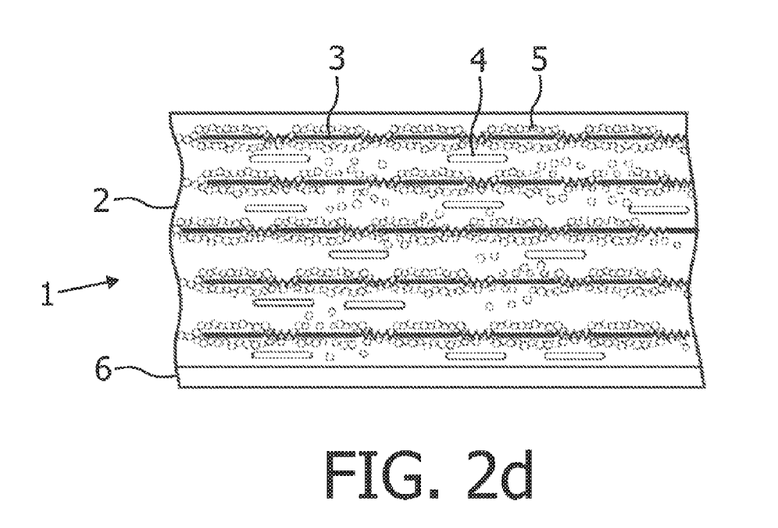

Then, the desired highly ordered smectic phase is obtained, maintaining the planar alignment. In this planar aligned highly ordered liquid crystal state, polymerization of the liquid crystal host is effected. Due to the polymerization, the individual hosts are immobilized, and orientation in the film is fixed (FIG. 2d).

Alternatively, the temperature of the film is lowered to a temperature below the gelating temperature of the gelating agent ($T_g$), but also below the transition temperature from the nematic or smectic A or C phase to the desired smectic $S_X$ phase. However, the transition from the nematic or smectic A or C phase to the desired smectic $S_X$ phase is generally slower than the process of gel formation, and thus, if the temperature is lowered rapidly, the gel is formed before the desired highly ordered smectic $S_X$ phase is obtained.

Polymerization of the polymerizable liquid crystal host in the desired smectic phase is typically effected by conventional means, depending on the type of reactive groups on the liquid crystals and optionally on the type of initiator used. Typical means of polymerization include actinic radiation, such as e-beam and UV-light.

The polymerization is carried out such that the orientation is essentially maintained.

Viscosity enhancers suitable for use in the present invention include compounds that may gelate the film such that as to hamper the transition of the un-polymerized liquid crystal host planar to homeotropical alignment. Meanwhile, the gelated viscosity enhancer should not prevent the transition from the nematic or smectic A or C phase into the desired highly ordered smectic $S_X$ phase (X not A or C).

Preferably, the transition hampering gelation occurs before the highly ordered smectic phase (with homeotropic alignment) is entered.

Preferably, the gelation should occur when the liquid crystal host is in the smectic A or C phase, or in the nematic phase.

As used herein, the term "viscosity enhancer" and related terms refer to a compound or combination of compounds having a viscosity enhancing effect on a composition in which it is comprised. A "viscosity enhancing effect", as used herein refers to that the change in viscosity of a liquid composition due to a change in a physical condition, such as temperature, is significantly greater than what would normally occur for the composition without the viscosity enhancer. Typically, the viscosity enhancer yields a dramatic change increase in viscosity upon temperature decrease, at least in a certain temperature interval.

For example, above a certain temperature, the viscosity enhancer does not affect the viscosity of the liquid composition to an appreciable extent. However, below this temperature, the viscosity of the liquid composition is dramatically increased or essentially gelated.

In the context of the present invention, one effect of a viscosity enhancer is that the transition from planar to homeotropical alignment is hampered or prevented.

Examples of viscosity enhancers include such compounds commonly known as organic gelators. Organic gelators are molecules that can gelate organic media by forming long fibrillar aggregates, that in turn form a three-dimensional network.

When such a fibrillar aggregates forms in an anisotropic medium, such as in a liquid crystal composition in nematic or smectic A or C phase, an anisotropic gel-network may be formed (Jpn. J. Appl. Phys. 2000, 39, 2721-2726; Langmuir, 2002, 18, 7086-7088).

Such an anisotropic network may act as an internal alignment source for the liquid crystal host, thus suppressing the tendencies of homeotropic alignment.

Suitable organic gelators include those capable of forming an anisotropic network of fibrillar aggregates when gelated in a nematic or smectic liquid crystal.

Typically, the amount of gelator in the liquid crystal compound is less than about 10%, such as less than about 5%, for example, less that about 2% by weight.

Examples of organogelators include, but are not limited to, those mentioned by Terech and Weiss, Chem. Rev. 1997, 97, 3133-3159; Abdallah and Weiss, Adv. Mater 2000, 12, 1237-1247; Kato et al, Macromol. Rapid Commun. 2001, 22, 797-814; and Van Esch et al, Angewandte Chemie, Int. Edition, 2000, 39, 2263-2266, and include for example fatty acid derivatives, steroid derivatives, anthryl derivates, gelators containing steroidal and condensed aromatic rings, azobenzene steroid-based gelators, amino-acid type organogelators, organometallic compounds, macrocyclic gelators, sorbitol and polyol derivatives, cellobiose octa(decanoat), n-alkanes, partially fluorinated n-alkanes, two-component systems and cyclic and linear bis-urea compounds.

Examples of fatty acid derivatives acting as organic gelators include substituted fatty acids and monovalent metal salts, for example 12-hyroxyoctadecanoic acid and related metal salts thereof, and di- or trivalent metal salts of fatty acids, such as an aluminum salt of dihexadecyl phosphate.

Examples of steroid derivatives acting as organic gelators include deoxycholic, cholic, apocholic and lithocholic acids and salts thereof.

Examples of anthryl derivates acting as organic gelators include 2,3-bis-n-decycloxyantracene (DDOA).

Examples of gelators containing steroidal and condensed aromatic rings acting as organic gelators include cholesteryl 4-(2-anthryloxy)butanoat (CAB) ans cholesteryl antraquinone-2-carboxylate (CAQ).

Examples azobenzene steroid-based gelators include compounds having a polar azobenzene group linked at $C_3$ of a steroidal moiety.

Examples of amino-acid type organogelators include 2-octyldodecyl 4-[[(1-naphtylamino)carbonyl]amino]benzoate, N,N',N'''-tristearyltrimesamid (TSTA), N-benzyloxycarbonyl-L-alanine-4-hexadecanoyl-2-nitrophenylester.

Examples of organometallic compounds acting as organic gelators include mononuclear copper-β-diketonates, binuclear copper tetracarboxylates.

Examples of macrocyclic gelators include calix[4-8]arenes.

Examples sorbitol and polyol derivatives acting as organic gelators include 1,3:2,4-di-O-benzylidene-D-sorbitol (DBS) and derivatives thereof.

Examples of n-alkanes acting as organic gelators include such wherein n>24.

Examples of two-component systems acting as organic gelators include aminopyrimidine/dialkylbarbituric acid systems.

Other specific examples of gelators are known to those skilled in the art.

Typically, the gelator should be chosen such that is has its gelating temperature ($T_g$) below the transition temperature of isotropic to nematic or smectic A or C phase of the liquid crystalline composition, but above the transition temperature of nematic or smectic A or C to smectic $S_X$, where X is not A or C.

The person skilled in the art realizes that the present invention by no means is limited to the preferred embodiments described above or to the illustrative experiments below. On the contrary, many modifications and variations are possible within the scope of the appended claims. For example, the viscosity enhancer may not be an organic gelator forming fibrillar aggregates to gelate the film. The viscosity enhancer may be any other viscosity enhancing agent, which at a temperature below the transition temperature of isotropic to nematic or smectic A or C phase of the liquid crystalline composition, but above the transition temperature of nematic or smectic A or C to smectic $S_X$, where X is not A or C, increases the viscosity of the un-polymerized film to such an extent that the liquid crystal host is prevented from aligning homeotropical to the substrate.

Further, in some embodiments of the present invention, the liquid crystal host may it self exhibit or may have a moiety attached to it that exhibits the function of a dichroic light-absorbing dye. In such a case, there may be no need for additional dichroic light-absorbing dyes in the liquid crystal composition.

In addition, in some embodiments the polarizing film provided after obtaining the highly ordered smectic $S_X$ phase (X not A or C) in a gelated composition may be used without polymerization of the film, and thus, a un-polymerizable and/or un-polymerized liquid crystal host may be used.

A polarizer according to the present invention may be used for any application for which known polarizers have been used. For example, such a polarizer may advantageously be used in a liquid crystal display (LCD). When applied in a LCD, a substrate of the LCD may conveniently be used to support the polarizer. A polarizer of the present invention may advantageously be provided on the inside of the liquid crystal cell of the LCD.

Experiment 1

(Not in Accordance with the Invention)

A 33% weight solution of a 50/50 mixture of smectic reactive mesogens V and VI below (1% dichroic dye (NKX2029, Nippon Kankoh Shikiso Kenkyusho), 1% initiator (Irgacure 651, Ciba), 2% surfactant and 0.1% inhibitor (p-methoxyphenol)) in chlorobenzene was prepared.

Thin films with a thickness of approximately 2 micron were spin coated from this solution onto substrates provided with a rubbed polyimide alignment layer.

FIG. 3 depicts the micrographs of the obtained film between crossed polarizers directly after spin coating and at different temperatures. The microscope pictures on the right show images recorded at a 45° angle between the director of the alignment layer and polarizers, pictures on the left show images recorded at 0° angle.

Figure 3A:
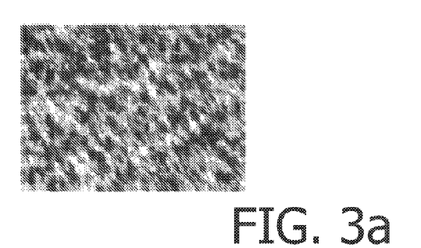
FIG. 3a-e shows experimental results for experiment 1 below.
Figure 3B:
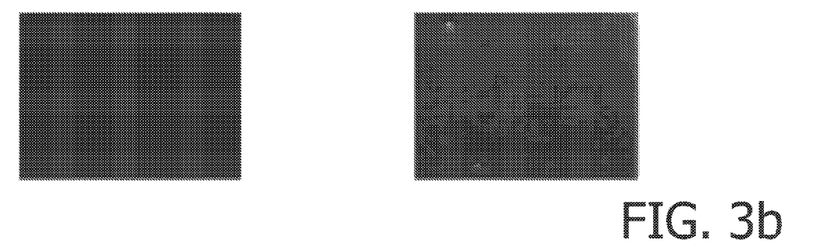
Figure 3C:
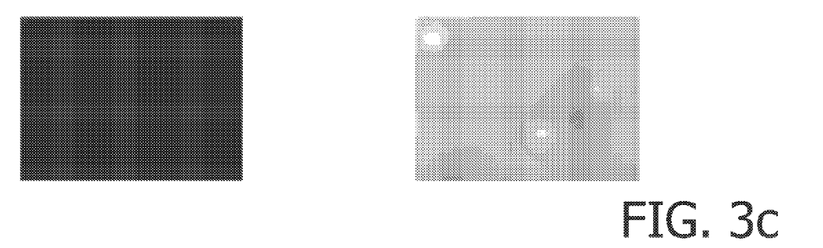

Directly after spin coating, a multi-domain film was obtained where the orientation of the mesogens was predominately homeotropic. Planar alignment was present in small domains only (FIG. 3a). The film was heated to 130°, where the mixture is isotropic (FIG. 3b). Thereafter, the sample was cooled.

At 122° C., the mixture was in the nematic phase. The orientation of the mesogens in the nematic phase is planar (due to the use of surfactant, FIG. 3c).

Figure 3D:
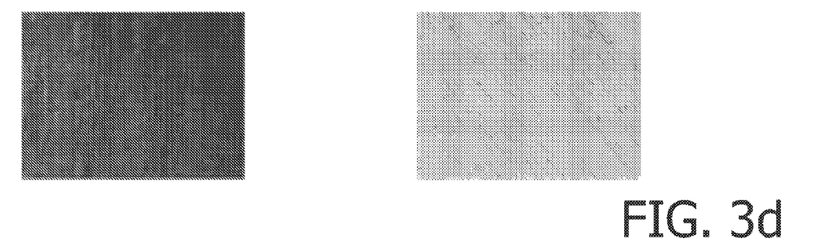
Figure 3E:
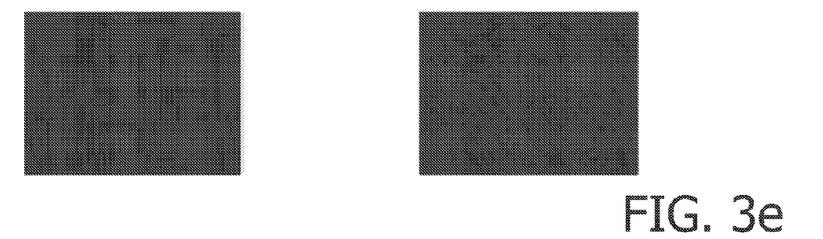

At 112° C., the mixture was in the smectic A phase. The microscope pictures show a dark picture under 0° and a bright picture under 45°, indicating that the orientation of the mesogens was still planar in this phase (FIG. 3d).

At 70° C., the mixture was in a highly ordered smectic phase. The microscope pictures (FIG. 3e) was dark both under 0° and 45°, showing that transition to homeotropic alignment of the mesogens had occurred.

Experiment 2

(In Accordance with the Invention)

A 33% weight solution of a 50/50 mixture of smectic reactive mesogens V and VI above (1% dichroic dye (NKX2029, Nippon Kankoh Shikiso Kenkyusho), 1% initiator (Irgacure 651, Ciba), 2% surfactant and 0.1% inhibitor (p-methoxyphenol)) in chlorobenzene was prepared.

To this solution 1 weight % (relative to solid content) of 12-hydroxyoctadecanoic acid (gelating agent) was added.

Figure 4A:
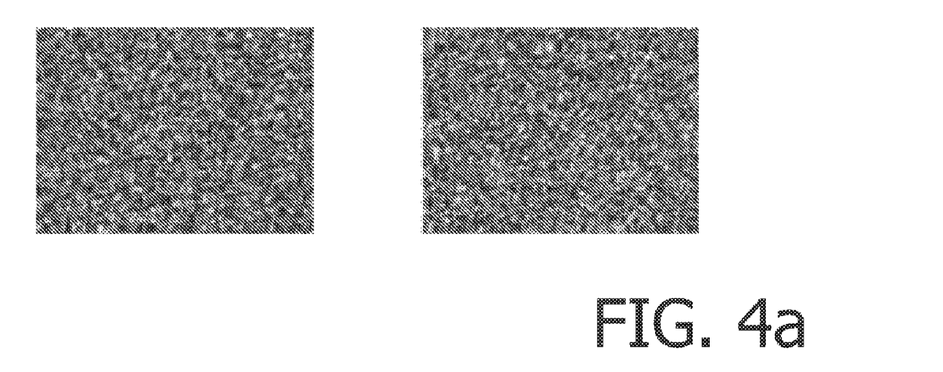
FIG. 4a-c shows experimental results for experiment 2 below.
Figure 4B:
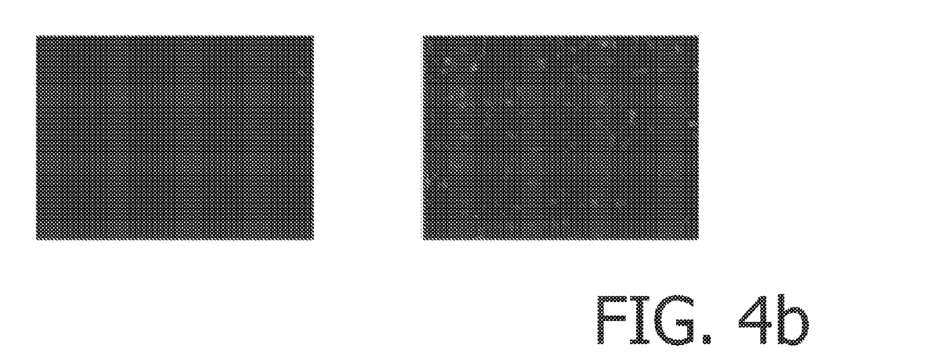

Thin films were spin coated from this solution with a thickness of approximately 2 micron. Microscope pictures of these films, recorded between crossed polarizers, are depicted in FIG. 4 (left under 0° and right under 450).

Directly after spin coating, the film was opaque. Both homeotropic and planar alignment was present in the spin-coated film (FIG. 4a).

When the film was heated to 130° C. (isotropic phase) and subsequently cooled with 20° C./min to room temperature (highly ordered smectic phase), the mesogens in the films showed a homeotropic alignment (FIG. 4b).

Figure 4C:
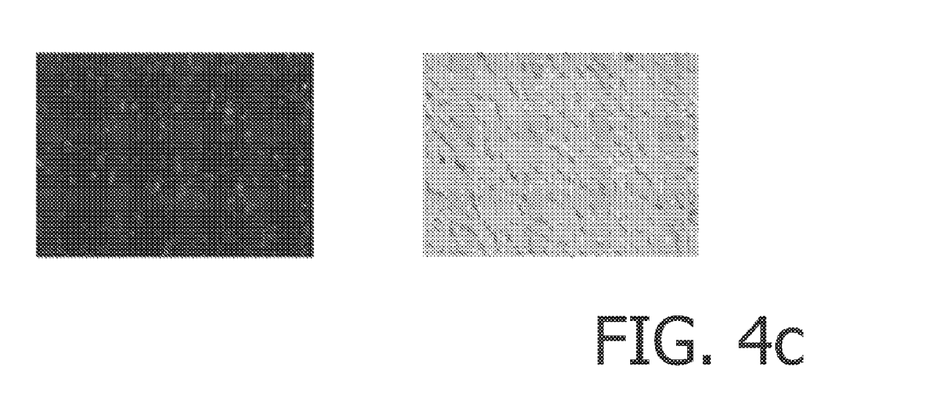

However, when the film was heated to 130° C. and subsequently cooled very fast to room temperature, by transferring the substrate from the hotplate directly onto a metal block, the microscope pictures showed that planar alignment in the film was preserved (FIG. 4c).

Thus, the addition of low molecular weight organic gelators to the reactive mesogen mixture in combination with fast cooling resulted in spin coated guest-host polarizers with planar alignment of the smectic reactive mesogens.

Experiment 3

(In Accordance with the Invention)

The liquid crystal composition of experiment 2 was used, except that 0.6% of a DBS-derivative was used as gelator instead of 12-hydroxyoctadecanoic acid.

The procedure of experiment 2 was followed, but for this gelator, the planar orientation was maintained also after the film was cooled at 20° C./min from 130° C. to room temperature (results not shown).

This experiment demonstrates that fast cooling is not necessary in this case in order to obtain planar alignment in the highly ordered smectic phase.

The invention claimed is:

1. A method for the manufacture of a polarizer, comprising:
   providing a liquid crystal composition comprising a liquid crystal host and a viscosity enhancer;
   providing a thin film of said composition on a substrate;
   orienting said liquid crystal host to obtain an aligned film in a first liquid crystal mesophase, wherein the liquid crystal host is aligned planar to said substrate;
   gelating said viscosity enhancer to congeal said film; and
   obtaining a second liquid crystal state in said congealed film.

2. The method according to claim 1, wherein said liquid crystal host is polymerizable and said method further comprises polymerizing said liquid crystal host in said second liquid crystal state in said congealed film.

3. The method according to claim 1, wherein a dichroic light-absorbing guest is dispersed in said liquid crystal composition.

4. The method according to claim 1, wherein said viscosity enhancer forms fibrillar aggregates in said film upon gelation.

5. The method according to claim 1, wherein said viscosity enhancer is an organic gelator.

6. The method according to claim 5, wherein said organic gelator is chosen from the group consisting of fatty acid derivatives, steroid derivatives, anthryl derivates, gelators containing steroidal and condensed aromatic rings, azobenzene steroid-based gelators, amino-acid type organogelators, organometallic compounds, macrocyclic gelators, sorbitol and polyol derivatives, cellobiose octa(decanoat), n-alkanes, partially fluorinated n-alkanes, two-component systems and cyclic and linear bis-urea compounds and combinations of two or more thereof.

7. The method according to claim 1, wherein the orientation in said first liquid crystal state is or corresponds to a nematic phase or a smectic phase Sy, wherein Y is A or C.

8. The method according to claim 1, wherein said first liquid crystal state is obtained at a temperature above the gelating temperature for said viscosity enhancer.

9. The method according to claim 1, wherein the orientation in said second liquid crystal state is or corresponds to a smectic phase $S_x$, wherein X is not A or C.

10. The method according to claim 1, wherein said second liquid crystal state is obtained at a temperature below the gelating temperature for said viscosity enhancer.

11. The method according to claim 1, wherein said liquid crystal host comprises a polymerizable liquid crystal of formula (I):

wherein
X, X' and X" independently is substituted or un-substituted Ph or Cyc, where Ph is a 1,4-phenylene unit and Cyc is a trans-1,4-cyclohexene unit;
Y and Y' independently is —CH$_2$CH$_2$—, —CH$_2$O—, —OCH$_2$—, —OCO—, —COO—, —N=N—, —C=C—, —C≡C—, —C=N—;
U and U' independently is a polymerizable group, or U is a polymerizable group and U' =H, or U=H and U' is a polymerizable group;
V and V' independently is a spacer; and
W and W' independently is a direct bond, —O—, —S—, —COO—, or —OCO—.

12. The method according to claim 1, wherein said dichroic light-absorbing guest comprises an azo dye.

13. A polarizer obtained by the method according to any of the claims 1 to 12.

14. A polarizer obtained by the method according to claim 1, said polarizer comprising an oriented film including an oriented liquid crystal host, a dichroic light-absorbing guest dispersed in and oriented with said host, and a gelated viscosity enhancer.

15. The polarizer according to claim 14, wherein said oriented liquid crystal host is in planar alignment.

16. The polarizer according to claim 14, wherein said viscosity enhancer forms fibrillar aggregates in said film.

17. The polarizer according to claim 14, wherein said viscosity enhancer is an organic gelator.

18. The polarizer according to claim 17, wherein said organic gelator is selected from the group consisting of fatty acid derivatives, steroid derivatives, anthryl derivates, gelators containing steroidal and condensed aromatic rings, azobenzene steroid-based gelators, amino-acid type organogelators, organometallic compounds, macrocyclic gelators, sorbitol and polyol derivatives, cellobiose octa(decanoat), n-alkanes, partially fluorinated n-alkanes, two-component systems and cyclic and linear bis-urea compounds and combinations of two or more thereof 19. The polarizer according to claim 14, wherein the orientation of said oriented liquid crystal host is or corresponds to the orientation of a smectic phase $S_x$, wherein X is not A or C.

20. The polarizer according to claim 14, wherein said oriented liquid crystal host is a polymerized liquid crystal host.

21. The polarizer according to claim 20 wherein said polymerized liquid crystal host comprises polymerized liquid crystals of formula (I)

wherein
X, X' and X" independently is substituted or un-substituted Ph or Cyc, where Ph is a 1,4-phenylene unit and Cyc is a trans-1,4-cyclohexene unit;
Y and Y' independently is —CH$_2$CH$_2$—, —CH$_2$O—, —OCH$_2$—, —OCO—, —COO—, —N=N—, —C=C—, —C≡C—, —C=N—;
U and U' independently is a polymerizable group, or U is a polymerizable group and U' =H, or U=H and U' is a polymerizable group;
V and V' independently is a spacer; and
W and W' independently is a direct bond, —O—, —S—, —COO—, or —OCO—.

22. The polarizer according to claim 14, wherein said dichroic light-absorbing guest comprises an azo dye.

23. A composition for use in the manufacture of the polarizer according to claim 1, comprising a liquid crystal host, a dichroic light-absorbing guest and a viscosity enhancer.

24. The according to claim 23, wherein said viscosity enhancer forms fibrillar aggregates in said composition upon gelation.

25. The composition according to claim 23, wherein said viscosity enhancing agent is an organic gelator.

26. The composition according to claim 25, wherein said organic gelator is selected from the group consisting of fatty acid derivatives, steroid derivatives, anthryl derivates, gelators containing steroidal and condensed aromatic rings, azobenzene steroid-based gelators, amino-acid type organogelators, organometallic compounds, macrocyclic gelators, sorbitol and polyol derivatives, cellobiose octa(decanoat), n-alkanes, partially fluorinated n-alkanes, two-component systems and cyclic and linear bis-urea compounds and combinations of two or more thereof.

27. The composition according to claim 25, wherein the gelation temperature of said organic gelator is below the phase transition temperature of the liquid crystal composition from isotropic phase to a first liquid crystal phase and above the transition temperature of the liquid crystal composition from a first liquid crystal phase to a second liquid crystal phase, where said first liquid crystal phase is nematic or smectic Sy, said second liquid crystal phase is $S_x$, Y is A or C and X is not A and not C.

28. The composition according to claim 23, wherein said liquid crystal host is a polymerizable liquid crystal host.

29. The according to claim 23, wherein said liquid crystal host comprises a polymerizable liquid crystal of formula (I)

wherein
X, X' and X" independently is substituted or un-substituted Ph or Cyc, where Ph is a 1,4-phenylene unit and Cyc is a trans-1,4-cyclohexene unit;
Y and Y' independently is —CH$_2$CH$_2$—, —CH$_2$O—, —OCH$_2$—, —OCO—, —COO—, —N=N—, —C=C—, —C≡C—, —C=N—;
U and U' independently is a polymerizable group, or U is a polymerizable group and U' =H, or U=H and U' is a polymerizable group;

V and V' independently is a spacer; and

W and W' independently is a direct bond, —O—, —S—, —COO—, or —OCO—.

30. The composition according to claim 23, wherein said dichroic light-absorbing guest comprises an azo dye.

31. A liquid crystal display comprising a polarizer according to claim 13.

* * * * *